Figure 1:
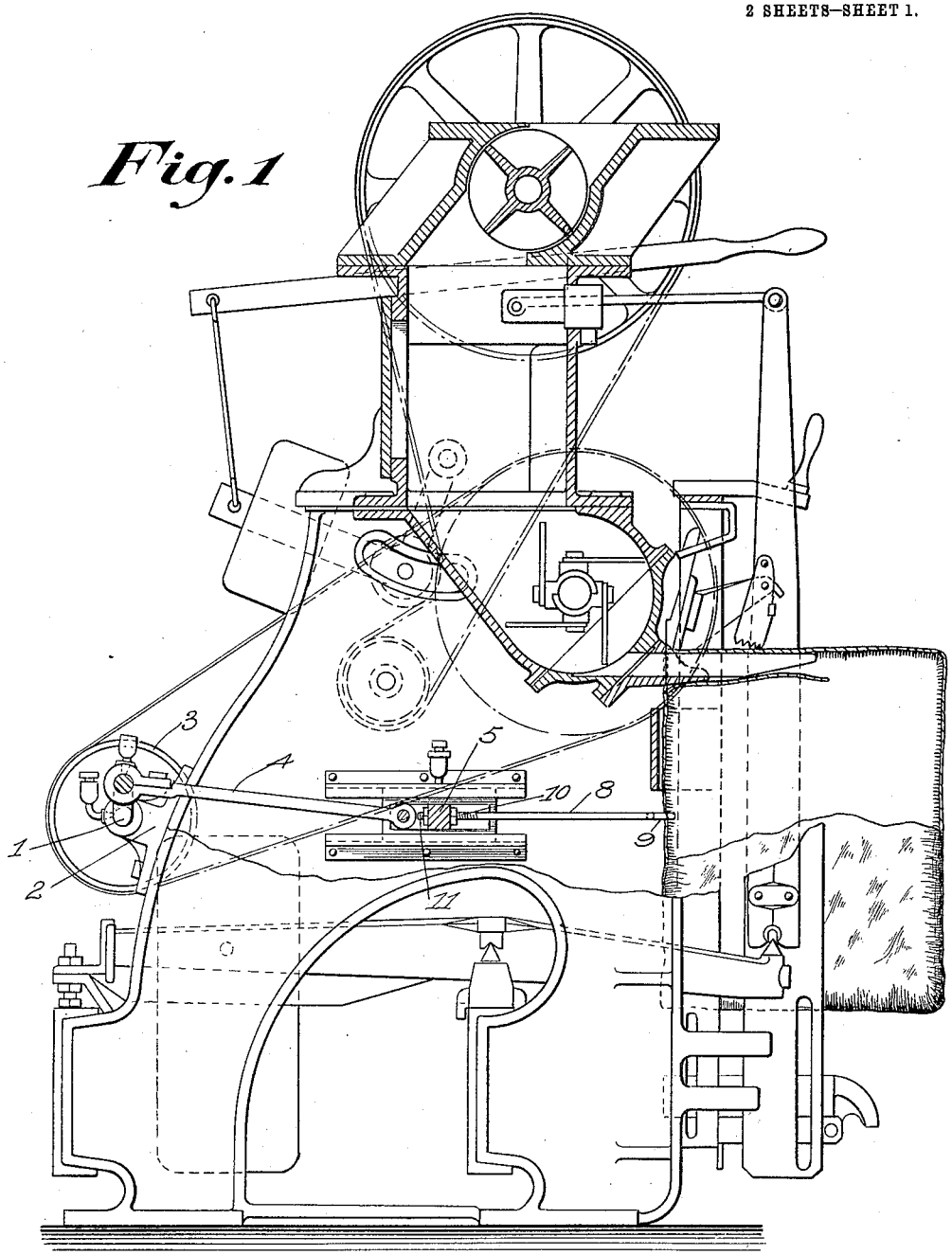

C. BORDIER.
JOLTER FOR SACKING MACHINES.
APPLICATION FILED MAY 19, 1913.

1,076,480.

Patented Oct. 21, 1913.

2 SHEETS—SHEET 1.

Witnesses:

CLAUDE BORDIER Inventor

By

Attorneys

C. BORDIER.
JOLTER FOR SACKING MACHINES.
APPLICATION FILED MAY 19, 1913.
1,076,480.
Patented Oct. 21, 1913.
2 SHEETS—SHEET 2.
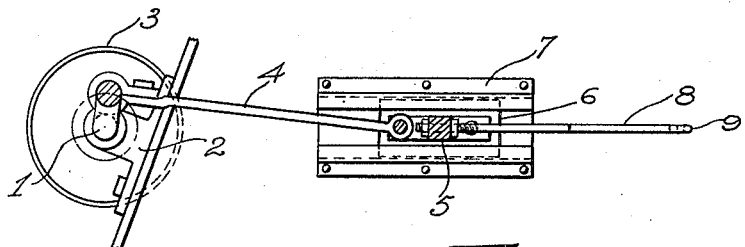
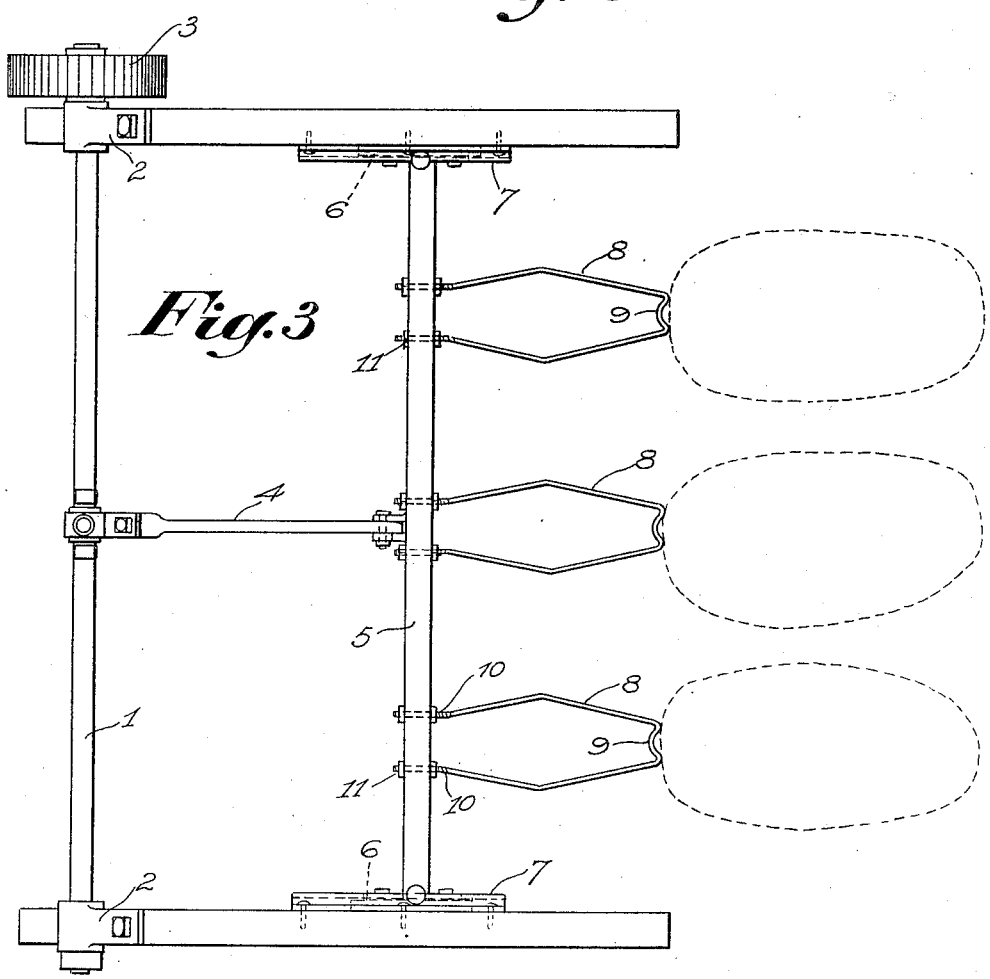

UNITED STATES PATENT OFFICE.

CLAUDE BORDIER, OF KILBOURN SIDING, QUEBEC, CANADA.

JOLTER FOR SACKING-MACHINES.

1,076,480.

Specification of Letters Patent.   Patented Oct. 21, 1913.

Application filed May 19, 1913.   Serial No. 768,656.

*To all whom it may concern:*

Be it known that I, CLAUDE BORDIER, a citizen of the French Republic, residing at Kilbourn Siding, Laval county, Province of Quebec, Canada, have invented certain new and useful Improvements in Jolters for Sacking-Machines; and I do hereby declare that the following is a full, clear, and exact description of the invention, such as will enable others skilled in the art to which it appertains to make and use the same.

The invention to be hereinafter described relates to jolters for sacking machines.

In order to more clearly disclose the construction, operation, and use of the invention, reference should be had to the accompanying drawings forming part of the present application.

Throughout the several figures of the drawings like reference characters designate the same parts.

In the drawings: Figure 1 is a central, vertical, lateral, cross section through a sacking machine, with the invention applied; Fig. 2 is a top plan view of the jolter; and Fig. 3 is a fragmentary side elevation of one of the jolter guides.

The main objects of the invention are to provide a simple, durable, economical, and compact jolter which may be quickly and easily applied to and used on a sacking machine without change or alteration of the machine.

Referring to the drawings in detail, 1 indicates a crank shaft journaled in movable bearings 2 adapted to be bolted or otherwise detachably secured to the frame work of the machine. One end of the shaft is provided with a drive pulley 3 driven by a suitable belt either direct from the main shaft of the machine, or indirectly. Any other suitable driving connections and means may be used, of course. The shaft 1 is provided with one or more cranks and each crank carries a pitman 4 the opposite end of which is flexibly connected to a reciprocable cross head or beam 5 the opposite ends of which are provided with heads 6 slidably mounted in guide ways 7 which are removably secured to the frame work of the machine in any suitable manner. This beam 5 carries a number of jolter heads 8 consisting of a wire frame having somewhat the shape of a narrow elongated U with each side bent outwardly at an angle at a point about midway of its length, and the bottom curved inwardly as at 9. The free ends of the frame are screw threaded as at 10 and passed through the beam. These ends are provided with nuts 11 at the opposite faces of the beam. By turning these nuts, the length of the members 8, beyond the beam 5, may be regulated as desired. The opposite bends in each of the members 8 permit them to yield or flex, slightly, so that the blow they strike will not be too hard or sudden. This, also, prevents tearing, cutting, or other injury to the bag or sack. The inward curves 9 act as a further safeguard against such injury. As the end of the member 8 engages the bag, the two rounded corners will push into the surface until the surface between these corners fits the curve, thus providing a small slack which will be taken up as the member 8 continues its inward movement, provided the sack is sufficiently full to offer any appreciable resistance to the jolting motion of the member 8. The result is that each jolt is in the nature of a sudden but yielding push. Without the curve 9, the action would be more of a sudden poke, and without the spread of the members 8 at their longitudinal centers, there would be no yielding action.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

1. In a device of the character described, a crank shaft, a movable beam, connections between said beam and shaft, and yielding jolter heads carried by said beam.

2. In a device of the character described, a crank shaft, a reciprocable beam, guide ways for the opposite ends of said beam, connections between said beam and said crank shaft, and yielding jolter heads carried by said beam.

3. In a device of the character described, a crank shaft, a movable beam, connections between said shaft and beam, yielding jolter heads, and adjustable connections between said heads and said beam.

In witness whereof I have hereunto set my hand in the presence of two witnesses.

CLAUDE BORDIER.

Witnesses:
L. A. GAUVIN,
A. BASTIEN.